No. 628,793. Patented July 11, 1899.
G. F. GRIFFIN.
CAP AND COUPLING FOR PIPES, TUBES, &c.
(Application filed Apr. 28, 1899.)

(No Model.)

Witnesses:—
Peter S. Hughes.
William Crossley

Inventor
Gerard Featherstone Griffin
per Hughes & Young
Attorneys.

UNITED STATES PATENT OFFICE.

GERARD FEATHERSTONE GRIFFIN, OF LONDON, ENGLAND.

CAP AND COUPLING FOR PIPES, TUBES, &c.

SPECIFICATION forming part of Letters Patent No. 628,793, dated July 11, 1899.

Application filed April 28, 1899. Serial No. 714,921. (No model.)

*To all whom it may concern:*

Be it known that I, GERARD FEATHERSTONE GRIFFIN, a subject of the Queen of Great Britain and Ireland, residing at Hampton Court Villa, Acton Vale, London, in the county of Middlesex, England, have invented new and useful Improvements in Caps and Couplings for Pipes, Tubes, Hose, Shafts, Rods, and other Articles and for any Analogous Purposes, (for which I have applied for a patent in Great Britain, No. 7,961, dated April 15, 1899,) of which the following is a specification.

My invention relates to improvements in caps and couplings for pipes, tubes, hose, shafts, rods, and other articles and for any analogous purposes; and the object is to provide an air and water tight joint or coupling which can be more easily connected and disconnected than the usual screw-joint. Although more especially intended for use with the inflating-valves of the pneumatic tires of cycles and other vehicles, I do not confine it to that one use, as it can, with or without modification, be used for other than that particular purpose.

The arrangement which constitutes my invention consists, essentially, of two parts—namely, a socket portion and a plug portion fitting therein—and to more fully explain the construction of each part I make reference to the accompanying drawings, in which—

Figure 1:
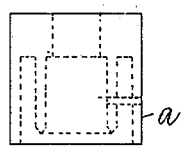
Figure 2:
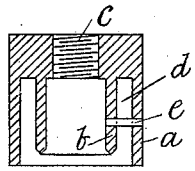
Figure 6:
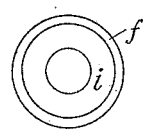
Figure 3:
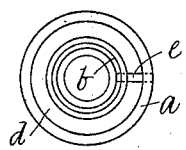
Figure 4:
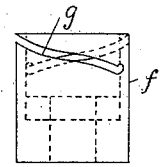
Figure 5:
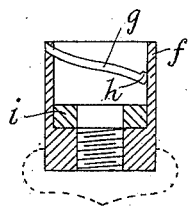

Figure 1 is a front view, Fig. 2 a longitudinal section, and Fig. 3 a plan, of the socket portion; and Fig. 4 a front view, Fig. 5 a longitudinal section, and Fig. 6 a plan, of the plug portion.

Similar letters indicate the same parts wherever occurring.

The socket portion has two concentric walls $a$ and $b$ upstanding at one end, the other end being screwed, as at $c$, or otherwise formed and provided for attachment to the article with which the part is to be used. The space or channel $d$ between the walls $a$ and $b$ is bridged by a pin $e$, passing across it from wall to wall, and, if desired, there may be more than one such pin. The second or plug part has a rim $f$ at one end, the rim being of such size as will fit snugly into the channel or space $d$ between the walls $a$ and $b$ of the socket portion. In this rim $f$ is an upwardly-slanting notch or open-ended slot $g$, or more than one of such notches, each terminating with a recess $h$. In practice I prefer to have one pin $e$ and two notches $g$. When the plug is to serve as a cap—say for a cycle-valve—the unnotched end is closed, as shown by dotted lines in Fig. 5, and may be formed with a suitable terminal. When the plug is not to serve as a cap, the unnotched end is to be screwed or otherwise attached to the article with which it is to be used. Milled-edge projections or other devices may be provided on each portion to facilitate the attachment and detachment of them to and from each other.

To make the joint air and water tight, I provide within the plug a disk-like or a ring-like rubber spring or other resilient washer $i$, which when the two parts are coupled together will press on the edge of the inner wall $b$ of the socket portion and so form a seal. In use the plug part is placed with its rim $f$ in the space $d$, so as to receive the pin or pins $e$ within the upwardly-slanting notch or notches $g$ in the said rim $f$. The plug is then given a partial rotation, by which action the pin or pins rides or ride up the notch or notches $g$, which causes the wall $b$ to be wedged up against the washer $i$ and so make an air and water tight joint.

When the arrangement is applied as a substitute for the usual cap of a cycle-tire-inflating valve, the usual cap is screwed off and the socket and plug which constitute my invention are put on instead. The plug in this case is of course of cap shape and may be chained to the spoke, as usual. The pump-nozzle and the flexible or other connections will be arranged to attach to each other and to the valve by couplings of the kind already described.

It will be observed from the drawings and description that in all cases the rim $f$ of the plug portion is shrouded within the space $d$ between the concentric walls $a$ and $b$. In some cases also the pin or pins $e$ need not extend entirely across the channel $d$. The plug and socket portions are to be made of metal or other suitable material or combination of materials.

What I claim as my invention, and desire to secure by Letters Patent, is—

In joints or couplings for pipes and the like a socket having two concentric walls with a perceptible space between them and a pin or pins connecting the two walls, a plug having a rim to fit into the said space between the said concentric walls and an upwardly-inclined notch or open-ended slot or more than one such slots or notches to embrace the said pin or pins, a recess at the upper end of the said slot or notch or at the upper ends of the said slots or notches and a resilient washer within the rim of the said plug, substantially as described.

GERARD FEATHERSTONE GRIFFIN.

Witnesses:
WILLIAM CROSSLEY,
PETER C. HUGHES.